US008940171B2

(12) United States Patent
Shechter et al.

(10) Patent No.: US 8,940,171 B2
(45) Date of Patent: Jan. 27, 2015

(54) DIFFUSION AERATION FOR WATER AND WASTEWATER TREATMENT

(75) Inventors: Ronen Itzhak Shechter, Kiryat Tivon (IL); Lior Eshed, Nesher (IL); Eytan Baruch Levy, Rosh Ha'ain (IL); Tamar Ashlagi Amiri, Kibbutz Ma'ayan Zvi (IL)

(73) Assignee: Emefcy Limited, Caesarea (IL)

( * ) Notice: Subject to any disclaimer, the term of this patent is extended or adjusted under 35 U.S.C. 154(b) by 0 days.

(21) Appl. No.: 13/515,722

(22) PCT Filed: Dec. 14, 2010

(86) PCT No.: PCT/IL2010/001052
§ 371 (c)(1),
(2), (4) Date: Jul. 17, 2012

(87) PCT Pub. No.: WO2011/073977
PCT Pub. Date: Jun. 23, 2011

(65) Prior Publication Data
US 2012/0273414 A1    Nov. 1, 2012

Related U.S. Application Data

(60) Provisional application No. 61/286,055, filed on Dec. 14, 2009.

(51) Int. Cl.
*C02F 3/02* (2006.01)
*C02F 3/10* (2006.01)
*B01D 63/10* (2006.01)
*C02F 3/30* (2006.01)

(52) U.S. Cl.
CPC ........... *C02F 3/102* (2013.01); *B01D 63/10* (2013.01); *C02F 3/302* (2013.01); *B01D 2315/06* (2013.01); *C02F 2201/007* (2013.01); *C02F 2201/009* (2013.01); *C02F 2301/024* (2013.01); *C02F 2301/026* (2013.01); *C02F 3/301* (2013.01)
USPC ............ 210/615; 210/321.75; 210/321.83; 210/151; 210/620; 261/100

(58) Field of Classification Search
CPC ........ B01D 25/20; B01D 29/48; B01D 63/10; B01D 63/103; B01D 63/12; C02F 3/208; C02F 2301/026; C02F 3/102; C02F 3/1268; C12M 23/24
USPC ........ 210/615, 150, 620, 321.83, 321.75, 151
See application file for complete search history.

(56) References Cited

U.S. PATENT DOCUMENTS

| 5,116,506 | A | 5/1992 | Williamson et al. |
| 5,482,859 | A | 1/1996 | Biller |
| 5,486,475 | A | 1/1996 | Kramer |
| 5,585,004 | A | 12/1996 | Livingston |
| 6,168,648 | B1 | 1/2001 | Ootani et al. |
| 6,558,549 | B2 * | 5/2003 | Cote et al. ............ 210/605 |
| 6,645,374 | B2 | 11/2003 | Cote et al. |
| 6,908,547 | B2 | 6/2005 | Cote |
| 7,140,495 | B2 * | 11/2006 | Hester et al. ............ 210/490 |
| 7,279,215 | B2 * | 10/2007 | Hester et al. ............ 428/178 |
| 7,300,571 | B2 | 11/2007 | Cote |
| 7,303,677 | B2 | 12/2007 | Cote |
| 2002/0020666 | A1 | 2/2002 | Cote |
| 2003/0104192 | A1 | 6/2003 | Hester |
| 2005/0123727 | A1 | 6/2005 | Hester et al. |
| 2006/0096918 | A1 | 5/2006 | Semmens |
| 2007/0199904 | A1 | 8/2007 | Thompson |
| 2009/0017514 | A1 | 1/2009 | Datta et al. |

FOREIGN PATENT DOCUMENTS

| EP | 0 197 024 B1 | 10/1990 |
| JP | 2001-145896 A | 5/2001 |
| JP | 2007-095471 A | 4/2007 |
| JP | 2008-221070 A | 9/2008 |
| WO | 2011/073977 A1 | 6/2011 |

OTHER PUBLICATIONS

Azema et al, "Wastewater suspended solids by optical methods," 2001, Colloids and Surfaces A: Physiochemcal and Engineering Aspeces 204 pp. 131-140.*
International Search Report, PCT/IL2010/001052, Apr. 5, 2011.
A Written Opinion dated Apr. 5, 2011, which issued during the prosecution of Applicant's PCT/IL2010/001052.
An International Preliminary Report on Patentability dated Jun. 19, 2012, which issued during the prosecution of Applicant's PCT/IL2010/001052.
An English Translation of a Search Report dated May 17, 2013 which issued during the prosecution of Chinese Patent Application No. 201080056908.4.
An English translation of Office action dated Aug. 20, 2013 which issued during the prosecution of Japanese Patent Application No. 533933/2011.
Extended European Search Report dated Oct. 1, 2013 which issued during the prosecution of European Patent Application No. 10837161.8.
An English translation of an Office Action dated Apr. 30, 2014, which issued during the prosecution of Japanese Patent Application No. 542688/2012.
An English translation of an Office Action dated Mar. 13, 2014, which issued during the prosecution of Chinese Patent Application No. 201080056928.4.

* cited by examiner

*Primary Examiner* — Nam Nguyen
*Assistant Examiner* — Claire Norris
(74) *Attorney, Agent, or Firm* — Sughrue Mion, PLLC

(57) ABSTRACT

A system for treating wastewater including at least one water-treatment pathway having at least one wastewater inlet, at least one oxygen-permeable, water-impermeable wall, separating an interior of the pathway from outside air, and at least one treated wastewater outlet and arranged for at least aerobic treatment of the wastewater as it flows from the at least one wastewater inlet to the at least one treated wastewater outlet, at least one wastewater supply conduit, supplying the wastewater to the at least one wastewater inlet of the water-treatment pathway and at least one treated wastewater conduit, supplying treated wastewater from the at least one treated wastewater outlet of the at least one water-treatment pathway.

20 Claims, 3 Drawing Sheets

DIFFUSION AERATION FOR WATER AND WASTEWATER TREATMENT

REFERENCE TO RELATED APPLICATIONS

Reference is hereby made to U.S. Provisional Patent Application Ser. No. 61/286,055, entitled Diffusion Aeration for Water and Wastewater Treatment, filed Dec. 14, 2009, the disclosure of which is hereby incorporated by reference and priority of which is hereby claimed pursuant to 37 CFR 1.78 (a) (4) and (5)(i).

FIELD OF THE INVENTION

The present invention relates to wastewater treatment generally and more specifically to biological wastewater treatment.

BACKGROUND OF THE INVENTION

The following U.S. Patents are believed to represent the current state of the art:

U.S. Pat. Nos. 7,303,677; 7,300,571; 6,908,547; 6,645,374; 5,486,475 and 5,482,859.

SUMMARY OF THE INVENTION

The present invention seeks to provide improved wastewater treatment systems and methodologies.

There is thus provided in accordance with a preferred embodiment of the present invention a system for treating wastewater including at least one water-treatment pathway having at least one wastewater inlet, at least one oxygen-permeable, water-impermeable wall, separating an interior of the pathway from outside air, and at least one treated wastewater outlet and arranged for at least aerobic treatment of the wastewater as it flows from the at least one wastewater inlet to the at least one treated wastewater outlet, at least one wastewater supply conduit, supplying the wastewater to the at least one wastewater inlet of the water-treatment pathway and at least one treated wastewater conduit, supplying treated wastewater from the at least one treated wastewater outlet of the at least one water-treatment pathway.

There is also provided in accordance with a preferred embodiment of the present invention a method for treating wastewater including providing at least one water-treatment pathway having at least one wastewater inlet, at least one oxygen-permeable, water-impermeable wall, separating an interior of the pathway from outside air, and at least one treated wastewater outlet and arranged for at least aerobic treatment of the wastewater as it flows from the at least one wastewater inlet to the at least one treated wastewater outlet, supplying the wastewater to the at least one wastewater inlet of the water-treatment pathway and supplying treated wastewater from the at least one treated wastewater outlet of the at least one water-treatment pathway.

Preferably, the at least one oxygen-permeable, water-impermeable wall of the at least one water-treatment pathway is arranged to support a biofilm on an interior surface thereof.

In accordance with a preferred embodiment of the present invention a ratio of the surface area of the oxygen-permeable, water-impermeable wall to a flow-limiting cross sectional area of the pathway is at least 200:1. More preferably, a ratio of the surface area of the oxygen-permeable, water-impermeable wall to a flow-limiting cross sectional area of the pathway is at least 1000:1. Additionally or alternatively, a hydraulic diameter of the pathway is 5-20 millimeters.

Preferably, a ratio of the surface area of the oxygen-permeable, water-impermeable wall to an overall volume of the pathway is at least 100:1. More preferably, a ratio of the surface area of the oxygen-permeable, water-impermeable wall to an overall volume of the pathway is at least 150:1. Most preferably, a ratio of the surface area of the oxygen-permeable, water-impermeable wall to an overall volume of the pathway is at least 200:1.

In accordance with a preferred embodiment of the present invention the at least one water-treatment pathway is configured to promote a generally plug type flow of wastewater therethrough and a length, a width and a flow path depth of the pathway are selected to provide at least 4 theoretical stages, N; in a plug flow reactor thereby configured, where the number of theoretical stages in a plug flow reactor is calculated using the following equation:

$$N=7.4*Q*L/(W*D)$$

where:
N—number of theoretical stages;
Q—flow in units of m³/s;
L—flow path length in meters;
W—flow path width in meters; and
D—flow path depth or spacing in meters.

In accordance with a preferred embodiment of the present invention the at least one water-treatment pathway is configured to promote a generally plug type flow of wastewater therethrough and a length, a width and a flow path depth of the pathway are selected to provide at least 8 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of m³/s;
L—flow path length in meters;
W—flow path width in meters; and
D—flow path depth or spacing in meters.

Preferably, the at least one oxygen-permeable, water-impermeable wall is arranged in a spiral arrangement to define the at least one water-treatment pathway.

In accordance with a preferred embodiment of the present invention the at least one water-treatment pathway is arranged to define a generally vertical airflow passageway having a spiral cross-section. Additionally, the at least one water-treatment pathway includes multiple stacked pathways each arranged to define a generally vertical airflow passageway having a spiral cross-section and the vertical airflow passageways are mutually aligned. Additionally or alternatively, the system for treating wastewater also includes at least one fan providing a vertical airflow through the vertical airflow passageway.

Preferably, the vertical airflow passageways have a transverse thickness of between 4 and 20 mm.

In accordance with a preferred embodiment of the present invention the at least one oxygen-permeable, water-impermeable wall includes at least one of micro-perforated polypropylene and micro-perforated polyolefin. Additionally or alternatively, the at least one oxygen-permeable, water-impermeable wall includes at least one fabric layer.

In accordance with a preferred embodiment of the present invention the method also includes configuring the at least one water-treatment pathway to promote a generally plug type flow of wastewater therethrough and selecting a length, a width and a flow path depth of the pathway to provide at least 4 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of m³/s;
L—flow path length in meters;
W—flow path width in meters; and
D—flow path depth or spacing in meters.

In accordance with a preferred embodiment of the present invention the method also includes configuring the at least one water-treatment pathway to promote a generally plug type flow of wastewater therethrough and selecting a length, a width and a flow path depth of the pathway to provide at least 8 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of m³/s;
L—flow path length in meters;
W—flow path width in meters; and
D—flow path depth or spacing in meters.

In accordance with a preferred embodiment of the present invention the method also includes arranging the at least one oxygen-permeable, water-impermeable wall in a spiral arrangement to define the at least one water-treatment pathway.

In accordance with a preferred embodiment of the present invention, the method also includes arranging the at least one water-treatment pathway to define a generally vertical airflow passageway having a spiral cross-section. Additionally or alternatively, the method also includes providing multiple stacked water-treatment pathways, arranged each of the multiple stacked water-treatment pathways to define a generally vertical airflow passageway having a spiral cross-section and mutually aligning the vertical airflow passageways. Additionally or alternatively, the method also includes providing a vertical airflow through the vertical airflow passageway.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
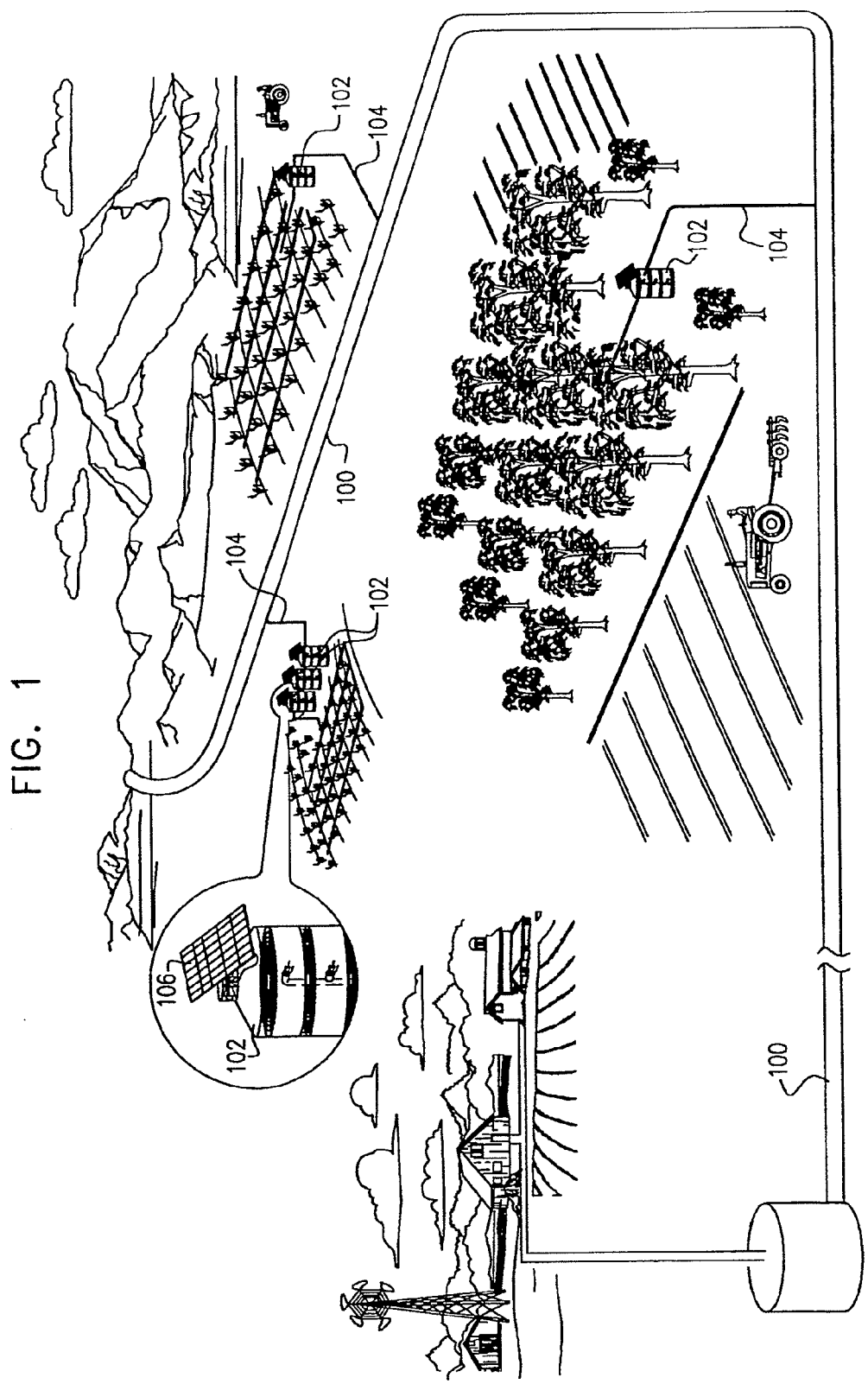
FIG. 1 is a simplified pictorial illustration of a decentralized wastewater treatment system constructed and operative in accordance with a preferred embodiment of the present invention.

Reference is now made to FIG. 1, which is a simplified pictorial illustration of a distributed wastewater treatment system constructed and operative in accordance with a preferred embodiment of the present invention. As seen in FIG. 1, wastewater from a rural town or village may be supplied via a wastewater conduit 100 to a plurality of distributed, compact, low energy wastewater treatment installations 102, constructed and operative in accordance with a preferred embodiment of the present invention, each receiving wastewater from wastewater conduit 100 via a branch wastewater supply line 104. As can be seen generally in FIG. 1, the wastewater treatment installations 102 have a relatively small footprint. By virtue of their low energy requirements, they can be powered by a photovoltaic panel 106.

Figure 2:
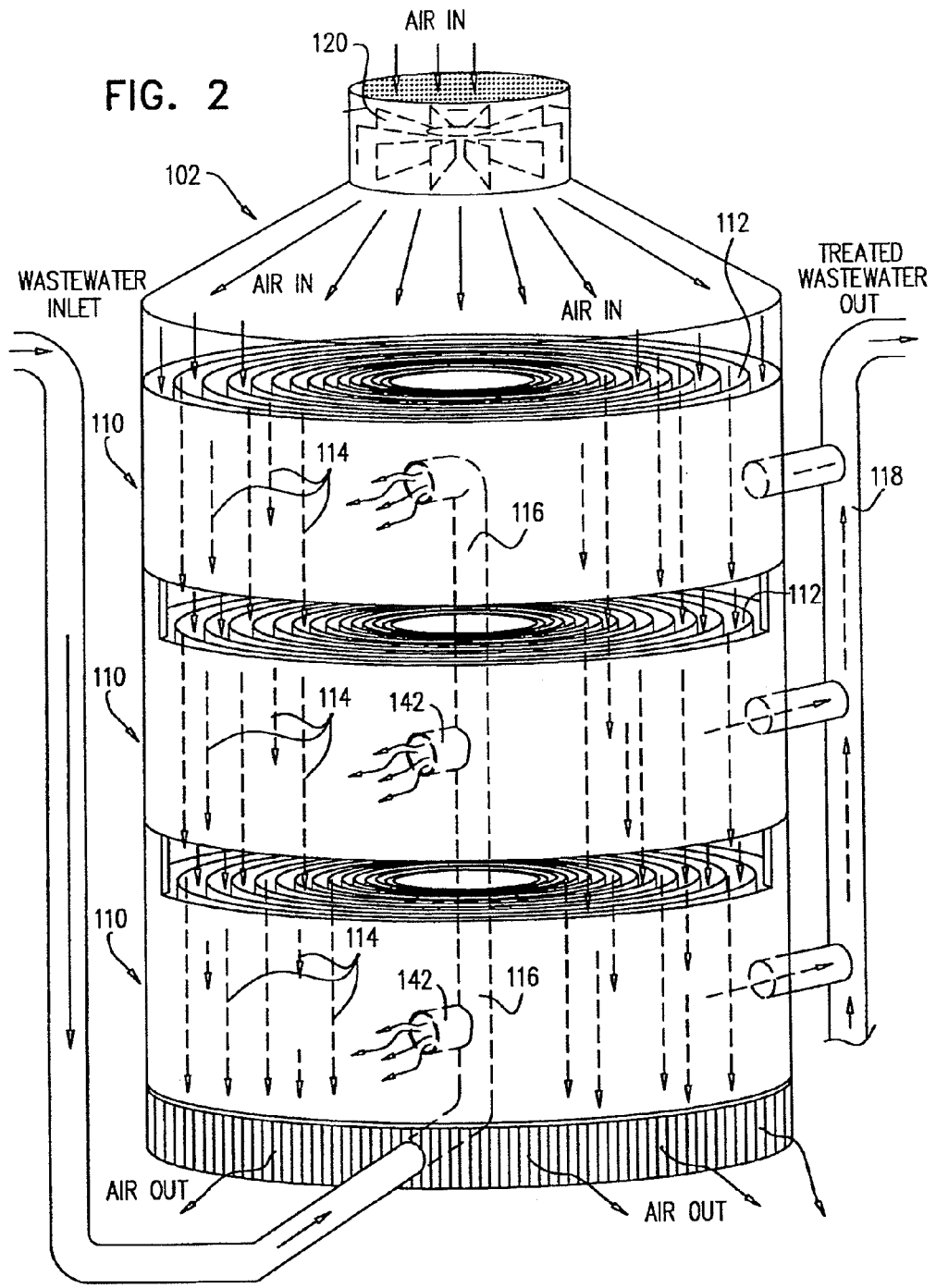
FIG. 2 is a simplified illustration of a wastewater treatment installation constructed and operative in accordance with a preferred embodiment of the present invention.

Reference is now made to FIG. 2, which is a simplified illustration of a compact, low energy wastewater treatment installation constructed and operative in accordance with a preferred embodiment of the present invention. As seen in FIG. 2, the compact, low energy wastewater treatment installation 102 includes a plurality of stacked modular wastewater treatment units 110, each preferably including a generally spiral wound generally horizontal wastewater pathway 112 arranged to define a generally vertical airflow passageway 114, having a spiral cross-section, between the windings thereof.

Preferably, the units 110 are mutually stacked such that their respective vertical airflow passageways 114 are mutually aligned. Wastewater is supplied to each of the pathways 112 via a wastewater supply manifold 116, which is preferably modular, and treated wastewater is received from each of the pathways 112 via a treated wastewater manifold 118, which is also preferably modular.

Preferably, a vertical airflow through airflow passageways 114 of multiple stacked units 110 is produced by a fan 120, which may be powered by a distributed power source, such as a photovoltaic panel 106 (FIG. 1), or by any other suitable power source. Alternatively, where sufficient draft may be created by means of heat or wind, the use of electrical power and possibly the use of fan 120 may be partially or fully obviated.

It is appreciated that, while in the illustrated embodiment of FIG. 2 treatment installation 102 includes a single fan 120, one or more of multiple stacked units 110 may include additional fans 120. In both the single fan and the multiple fan embodiments, treatment installation 102 includes a single air inlet.

In an alternative embodiment, a single fan may provide vertical airflow for multiple treatment installations 102 through a header connected to an air inlet of each of the multiple installations 102.

In the illustrated embodiment of FIG. 2, pathways 112 of respective stacked units 110 are shown connected in parallel. It is appreciated that alternatively, they may be connected in series. It is also appreciated that multiple installations 102 may be interconnected in series or in parallel, depending on the nature of the wastewater and the treatment requirements.

It is further appreciated that the water inlets and water outlets of multiple installations 102 may be interconnected in series for continuous water flow therethrough and multi-stage wastewater treatment.

Figure 3:
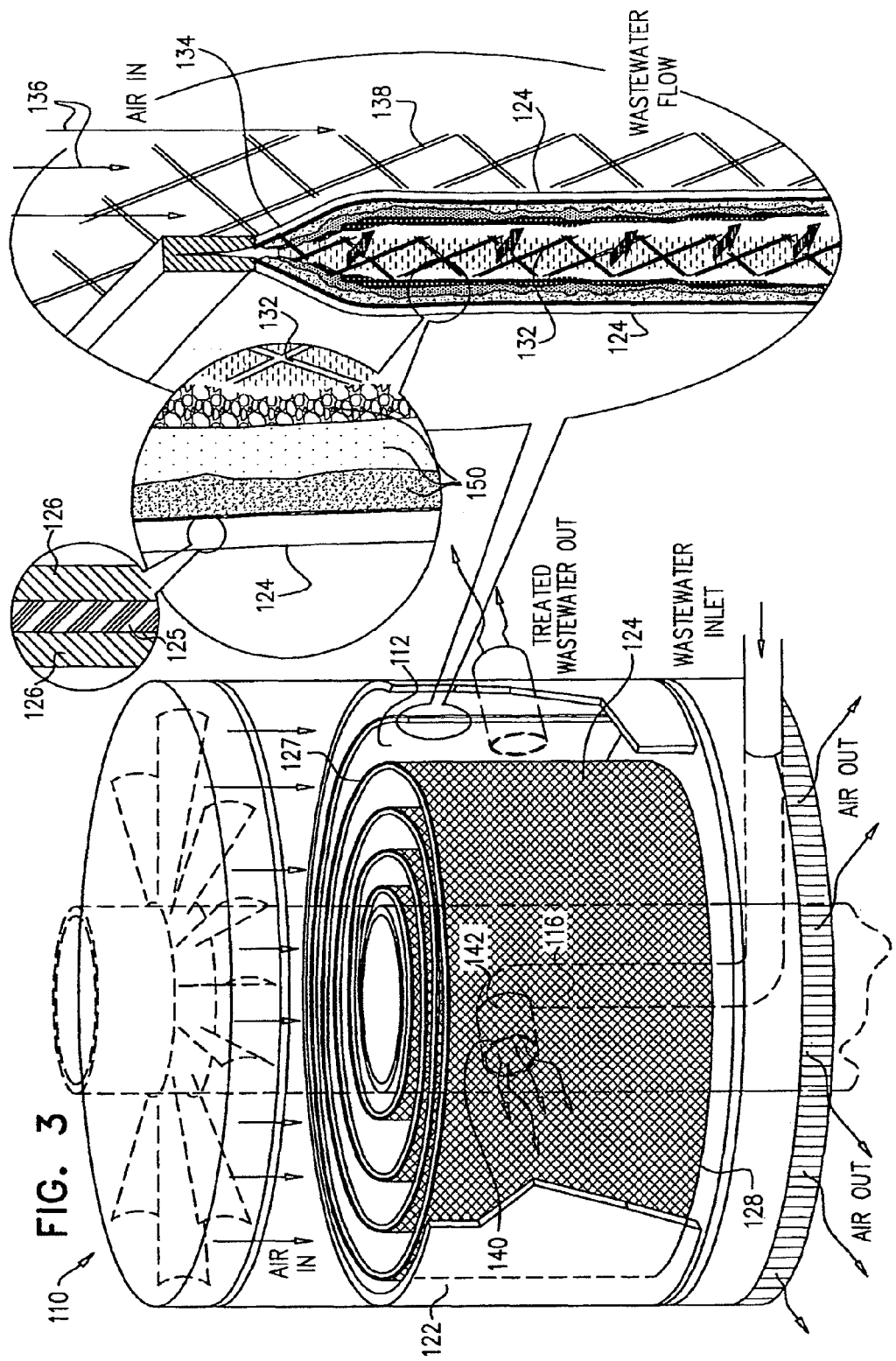
FIG. 3 is a simplified illustration of a modular unit of the wastewater treatment installation of FIGS. 1 and 2.

Reference is now made to FIG. 3, which is a simplified illustration of a modular unit 110 of the wastewater treatment installation 102 shown in FIGS. 1 and 2. As seen in FIG. 3, in each unit 110 a generally spiral wound generally horizontal wastewater pathway 112 is enclosed within a cylindrical enclosure 122. The pathway 112 is preferably formed with generally vertically extending spiral wound walls 124, each formed of a length of an oxygen-permeable, water-impermeable material 125, preferably micro-perforated polypropylene or other micro-perforated polyolefin, preferably attached to a fabric 126, preferably a plastic fabric, on at least one side. The oxygen-permeable, water-impermeable material 125 preferably has a thickness of less than 100 microns and more preferably has a thickness of less than 50 microns. Fabric 126 preferably has a thickness of less than 100 microns and is characterized as having a weight per unit area of less than 50 grams per square meter. The pathway 112 preferably has a spacing to provide for wastewater flow between two adjacent walls in the range of 4 mm to 20 mm.

Oxygen-permeable, water-impermeable material 125 is widely used in the construction industry for roofing and is also used in manufacturing disposable protective garments, such as 16 gsm Microflex Embossed Breathable Film, commercially available from Bohme Clopay GMBh of Dombuhl, Germany. Fabric 126 is typically a non woven fabric such as 10 gsm Hydrophilic Durable White, catalog number N-S70-26 I, commercially available from Avgol Ltd of Tel Aviv, Israel.

The respective top and bottom edges 127 and 128 of walls 124 are preferably sealed by heat pressing, ultrasonic welding or similar means applied onto several folds of the wall material over itself or onto an additional film of compatible material over the edges of the wall material. Walls 124 are preferably separated from each other by an internal spacer 132, which extends therealong. Preferably, walls 124 present a tapered top surface region 134, which provides relatively low resistance to air flow along vertical airflow passageways 114, as indicated by arrows 136. Preferably, along most of the height of pathway 112, the interior surfaces of the walls 124 are separated by a transverse distance of 4-20 mm by spacer 132.

Preferably, the pathways 112 are wound such that the exterior surfaces of the walls 124 of adjacent windings are separated by a transverse distance of 4-20 mm, thereby defining spiral vertical airflow passageways 114 having transverse thickness of 4-20 mm. The transverse thickness of passageway 114 is preferably maintained by provision of spacers 138 between adjacent winding of walls 124.

Spacers 132 and 138 are preferably drainage netting or reinforcement mesh or fencing screens or similar three dimensional plastic mesh grid products, such as a Drainage B net, catalog number B-420/4.6/0.7, part number 009442, commercially available from Boddington Ltd., Maldon, Essex, England.

Wastewater is supplied to the interior of pathway 112 via an aperture 140 formed in a wall 124 thereof at an interior end of the spiral wound wastewater pathway 112 via a wastewater supply interconnection pipe 142 which is connected to wastewater supply manifold 116. Alternatively, manifold 118 may operate as a wastewater supply manifold and manifold 116 may operate as a treated wastewater outlet manifold, so that wastewater is supplied from the exterior end of the spiral and flows along the pathway 112 towards the interior of the spiral.

The presence of wastewater at the interior of pathway 112 causes the formation of a biofilm 150 on inner surfaces of walls 124. Biofilm 150 receives oxygen via oxygen permeable walls 124 and is in operative contact with the wastewater for treating thereof. It is a particular feature of the present invention that the wastewater flows through the pathway 112 in operative contact with biofilm 150 which is formed on an interior surface of the pathway 112, which biofilm 150 receives oxygen via the wall 124 on which it is formed from an airflow exterior to the pathway 112.

Biofilm 150 preferably comprises a plurality of layers. In a well stabilized and properly operated system, the biofilm will have a differentiating composition along the flow path, mainly comprising varying percentages of the following layers:

1. closest to the wall 124, the biofilm will contain mostly aerobic bacteria, and the further down the flowpath the more autotrophic bacteria that oxidize ammonia and reduce carbonate;

2. adjacent to the biofilm layer closest to the wall 124, the biofilm will be richer in heterotrophic aerobic bacteria that oxidize organic matter;

3a. furthest from the wall 124, and mostly upstream along the flow path, where the concentration of organic matter in the wastewater is relatively high, the biofilm layer will be characterized by a high concentration of anaerobic bacteria that oxidize organic matter by reducing $CO_2$ or other alternative electron acceptors; and 3b. mostly downstream along the flow path, the layer furthest from the wall 124 will comprise heterotrophic bacteria performing denitrification, using the remaining dissolved organic matter from the water on one side and nitrate produced by nitrification in the first layer on the other side.

Water preferably flows in sufficiently turbulent flow through pathway 112, thus continuously applying shear on the layers of biofilm 150 and thus preventing excessive growth and clogging of the pathway 112. It is a particular feature of the present invention that the energy requirements for pumping the wastewater supplied to the pathway 112 may be relatively low or negligible, depending on topography and the flow pressure in wastewater conduit 100 (FIG. 1) and the energy losses therealong.

Preferably, the ratio of the surface area of the oxygen-permeable, water-impermeable wall 124 to a flow-limiting cross sectional area of pathway 112 is at least 200:1, and more preferably at least 1000:1. The typical hydraulic diameter is 5-20 millimeters.

Preferably pathway 112 is configured to have a ratio of the surface area of oxygen-permeable, water-impermeable wall 124 to the overall volume of the pathway of at least 100:1, more preferably at least 150:1 and most preferably at least 200:1. The high surface area per unit volume provides compactness which is an important factor in selecting a treatment process.

Pathway 112 is configured to promote a generally plug type flow of wastewater therethrough. Preferably, a length, a width and a flow path depth of pathway 112 are selected to preferably provide at least 4, and more preferably, at least 8, theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of $m^3/s$;
L—flow path length in meters;
W—flow path width in meters; and
D—flow path depth or spacing in meters.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for treating wastewater comprising:
at least one horizontal water-impermeable wall-enclosed water-treatment pathway having at least one wastewater inlet, at least one oxygen-permeable, water-impermeable wall, separating an interior of said at least one horizontal water-impermeable wall-enclosed water-treatment pathway from outside air, and at least one treated wastewater outlet, said at least one horizontal water-impermeable wall-enclosed water-treatment pathway being arranged for at least aerobic treatment of said wastewater as it flows from said at least one wastewater inlet to said at least one treated wastewater outlet, said at least one oxygen-permeable, water-impermeable wall of said at least one horizontal water-impermeable wall-enclosed water-treatment pathway being arranged to support a biofilm on an interior surface thereof;

at least one wastewater supply conduit, supplying said wastewater to said at least one wastewater inlet of said at least one horizontal water-impermeable wall-enclosed water-treatment pathway; and at least one treated wastewater conduit, supplying treated wastewater from said at least one treated wastewater outlet of said at least one horizontal water-impermeable wall-enclosed water-treatment pathway.

2. A system for treating wastewater according to claim 1 and wherein a ratio of the surface area of said oxygen-permeable, water-impermeable wall to a flow-limiting cross sectional area of said at least one horizontal water-impermeable wall-enclosed water-treatment pathway is at least 1000:1.

3. A system for treating wastewater according to claim 1 and wherein a hydraulic diameter of said at least one horizontal water-impermeable wall-enclosed water-treatment pathway is 5-20 millimeters.

4. A system for treating wastewater according to claim 1 and wherein a ratio of the surface area of said oxygen-permeable, water-impermeable wall to an overall volume of said at least one horizontal water-impermeable wall-enclosed water-treatment pathway is at least 100:1.

5. A system for treating wastewater according to claim 1 and wherein:

said at least one horizontal water-impermeable wall-enclosed water-treatment pathway is configured to promote a plug type flow of wastewater therethrough; and a length, a width and a flow path depth of said at least one horizontal water-impermeable wall-enclosed water-treatment pathway are selected to provide at least 4 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of $m^3/s$;
L—flow path length in meters;
W—flow path width in meters; and
D—flow path depth or spacing in meters.

6. A system for treating wastewater according to claim 1 and wherein:

said at least one horizontal water-impermeable wall-enclosed water-treatment pathway is configured to promote a plug type flow of wastewater therethrough; and a length, a width and a flow path depth of said at least one horizontal water-impermeable wall-enclosed water-treatment pathway are selected to provide at least 8 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of $m^3/s$;
L—flow path length in meters;
W—flow path width in meters; and
D—flow path depth or spacing in meters.

7. A system for treating wastewater according to claim 1 and wherein said at least one oxygen-permeable, water-impermeable wall is arranged in a spiral arrangement, said spiral arrangement defining said at least one horizontal water-impermeable wall-enclosed water-treatment pathway through said spiral from said at least one wastewater inlet to said at least one treated wastewater outlet.

8. A system for treating wastewater according to claim 1 and wherein said at least one horizontal water-impermeable wall-enclosed water-treatment pathway is arranged to define a generally vertical airflow passageway having a spiral cross-section.

9. A system for treating wastewater according to claim 8 and wherein:

said at least one horizontal water-impermeable wall-enclosed water-treatment pathway comprises multiple stacked horizontal water-impermeable wall-enclosed water-treatment pathways each arranged to define the generally vertical airflow passageway having a spiral cross-section; and said generally vertical airflow passageways are mutually aligned.

10. A system for treating wastewater according to claim 8 and also comprising at least one fan providing a vertical airflow through said generally vertical airflow passageway.

11. A method for treating wastewater comprising:

providing at least one horizontal water-impermeable wall-enclosed water-treatment pathway having at least one wastewater inlet, at least one oxygen-permeable, water-impermeable wall, separating an interior of said at least one horizontal water-impermeable wall-enclosed water-treatment pathway from outside air, and at least one treated wastewater outlet and arranged for at least aerobic treatment of said wastewater as it flows from said at least one wastewater inlet to said at least one treated wastewater outlet, said providing at least one horizontal water-impermeable wall-enclosed water-treatment pathway comprising arranging said at least one oxygen-permeable, water-impermeable wall of said at least one horizontal water-impermeable wall-enclosed water-treatment pathway to support a biofilm on an interior surface thereof;

supplying said wastewater to said at least one wastewater inlet of said at least one horizontal water-impermeable wall-enclosed water-treatment pathway; and supplying treated wastewater from said at least one treated wastewater outlet of said at least one horizontal water-impermeable wall-enclosed water-treatment pathway.

12. A method for treating wastewater according to claim 11 and wherein said providing at least one horizontal water-impermeable wall-enclosed water-treatment pathway comprises configuring said at least one horizontal water-impermeable wall-enclosed water-treatment pathway such that a ratio of the surface area of said oxygen-permeable, water-impermeable wall to a flow-limiting cross sectional area of said at least one horizontal water-impermeable wall-enclosed water-treatment pathway is at least 1000:1.

13. A method for treating wastewater according to claim 11 and wherein said providing at least one horizontal water-impermeable wall-enclosed water-treatment pathway comprises configuring said at least one horizontal water-impermeable wall-enclosed water-treatment pathway such that a hydraulic diameter of said at least one horizontal water-impermeable wall-enclosed water-treatment pathway is 5-20 millimeters.

14. A method for treating wastewater according to claim 11 and wherein said providing at least one horizontal water-impermeable wall-enclosed water-treatment pathway comprises configuring said at least one horizontal water-impermeable wall-enclosed water-treatment pathway such that a ratio of the surface area of said oxygen-permeable, water-impermeable wall to an overall volume of said at least one horizontal water-impermeable wall-enclosed water-treatment pathway is at least 100:1.

15. A method for treating wastewater according to claim 11 and also comprising:
configuring said at least one horizontal water-impermeable wall-enclosed water-treatment pathway to promote a plug type flow of wastewater therethrough; and
selecting a length, a width and a flow path depth of said at least one horizontal water-impermeable wall-enclosed water-treatment pathway to provide at least 4 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of $m^3/s$;
L—flow path length in meters;
W—flow path width in meters; and
D—flow path depth or spacing in meters.

16. A method for treating wastewater according to claim 11 and also comprising:
configuring said at least one horizontal water-impermeable wall-enclosed water-treatment pathway to promote a plug type flow of wastewater therethrough; and
selecting a length, a width and a flow path depth of said at least one horizontal water-impermeable wall-enclosed water-treatment pathway to provide at least 8 theoretical stages, N, in a plug flow reactor thereby configured, where the number of theoretical stages in a plug flow reactor is calculated using the following equation:

$$N=7.4*Q*L/(W*D)$$

where:
N—number of theoretical stages;
Q—flow in units of $m^3/s$;
L—flow path length in meters;
W—flow path width in meters; and
D—flow path depth or spacing in meters.

17. A method for treating wastewater according to claim 11 and also comprising arranging said at least one oxygen-permeable, water-impermeable wall in a spiral arrangement, said spiral arrangement defining said at least one horizontal water-impermeable wall-enclosed water-treatment pathway through said spiral from said at least one wastewater inlet to said at least one treated wastewater outlet.

18. A method for treating wastewater according to claim 11 and also comprising arranging said at least one horizontal water-impermeable wall-enclosed water-treatment pathway to define a generally vertical airflow passageway having a spiral cross-section.

19. A method for treating wastewater according to claim 18 and also comprising:
providing multiple stacked horizontal water-impermeable wall-enclosed water-treatment pathways;
arranging each of said multiple stacked horizontal water-impermeable wall-enclosed water-treatment pathways to define a generally vertical airflow passageway having a spiral cross-section; and
mutually aligning said generally vertical airflow passageways.

20. A method for treating wastewater according to claim 18 and also comprising providing a vertical airflow through said generally vertical airflow passageway.

\* \* \* \* \*